March 20, 1951 R. C. THOMAS 2,545,753
MOTOR
Filed Sept. 10, 1946 2 Sheets-Sheet 1

Inventor
R. C. Thomas

March 20, 1951  R. C. THOMAS  2,545,753
MOTOR

Filed Sept. 10, 1946  2 Sheets-Sheet 2

Inventor
R. C. Thomas

Attorney

Patented Mar. 20, 1951

2,545,753

UNITED STATES PATENT OFFICE 2,545,753

MOTOR

Ralph C. Thomas, Alexandria, Ind.

Application September 10, 1946, Serial No. 695,874

9 Claims. (Cl. 185—37)

This invention relates to improvements in Motors, and has particular relation to devices of this type in which the activating drive for the driven mechanism is by individual spring structures rendered active intermittently and in predetermined succession.

Various types of spring motors have been contemplated and developed, these generally involving the use of spring energy made active upon various mechanism, the structures generally utilizing coiled springs wound tightly to place the coils under tension, the normal tendency being to release the energy through unwinding of the coil with the release effective to provide the power drive. Where no special mechanism is employed to vary the operation, the spring tension is a practically constant power source while the tension is present; but such structures have their maximum power value when the springs are completely wound, the power value decreasing as the spring is unwound. Where such structures have springs brought into action successively, special mechanism must be provided to render the power of a spring impotent to drive the mechanism when a succeeding spring is rendered active—under these conditions the spring is unwound intermittently instead of constantly, but the general cycle of utilizing the power energy of the spring remains as before, the difference being in the length of time required to unwind the spring; hence, there is the loss of power value of the spring as in the constant type, but the loss is distributed over a longer length of time.

The present invention utilizes the tension values of springs as the power source, with the power of a spring exerted intermittently, but unlike the conditions pointed out above in this respect, the working range of power of the spring is completed each time the spring is made active, the possible power of the spring tension thus being expended each time the spring is made active. As a result, the tension power of a spring may approach more closely to the power needs of the mechanism being operated, and by utilizing a succession of such springs active intermittently in combination with a fly-wheel to set up a momentum factor, it is possible to provide a more uniform rotation of the mechanism by the spring power means, doing this without the necessity for the use of an intricate governor system.

The present embodiment of the invention disclosed herein utilizes four of such individual springs each of which is made successively active as a direct power source for a train of gearing, with the primary source of power provided manually, this latter being active primarily to provide an individual cycle of activity for a spring, with the cycles successively rendered active intermittently, such development being repeated to set up a continuous operation. Each cycle of spring activity involves initially placing the spring under a maximum tension from a condition of repose, then releasing the tensioned spring to permit the temporarily stored power thereof to be applied in driving the train of gearing, the latter action placing the spring in repose condition, a condition in which it remains until its turn is reached in the repetition of the succession of cycles, each spring successively passing through the cycle to add its power in continuing the operation of the train of gearing. Since the cycle of a spring is rendered active only intermittently with the maximum tension present but momentarily, the life of the spring is not materially affected by the continued operation of the mechanism so that the latter is of the long-life type, with the power factor of the springs approaching constancy. While the spring power varies during the cycle, it is greatest immediately following the release—at which time it begins its activity in driving the train—with this power active in maintaining the train momentum wheel speed, the latter wheel then augmenting the power effect as the spring power is reducing its power value, the cycle of the succeeding spring becoming active on the momentum wheel to approximately maintain the constancy in speed of the power take-off shaft at the end of the train of gearing.

To provide this result, the mechanism includes specific operating mechanism presently described in detail, the entire assembly being comparatively simple and efficient in operation, durable in construction, and which can be produced at reasonable costs.

To these and other ends, therefore, the nature of which will be more particularly understood as the invention is hereinafter disclosed, said invention consists in the improved constructions and combinations of parts, more fully described, illustrated in the accompanying drawings and more particularly pointed out in the appended claims.

In the accompanying drawings, in which similar reference characters indicate similar parts in each of the views.

Figure 1:
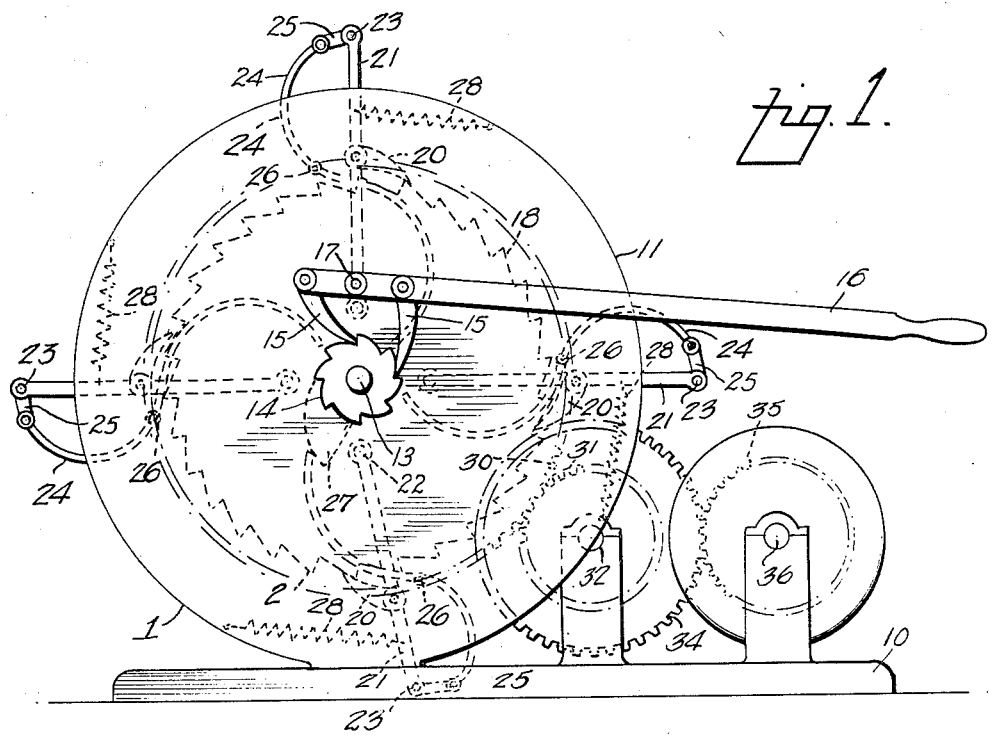
Figure 1 is a face view of the particular form of the invention disclosed herein.
Figure 2:
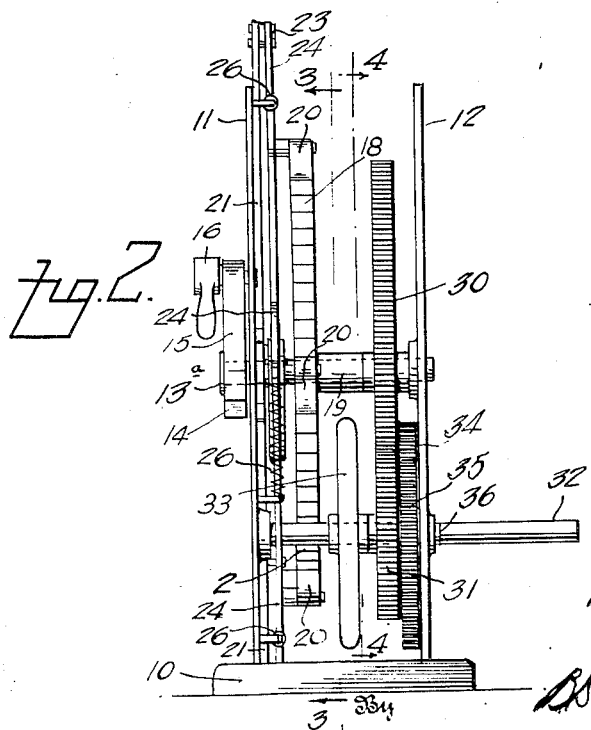
Figure 2 is an edge view of the same.
Figure 3:
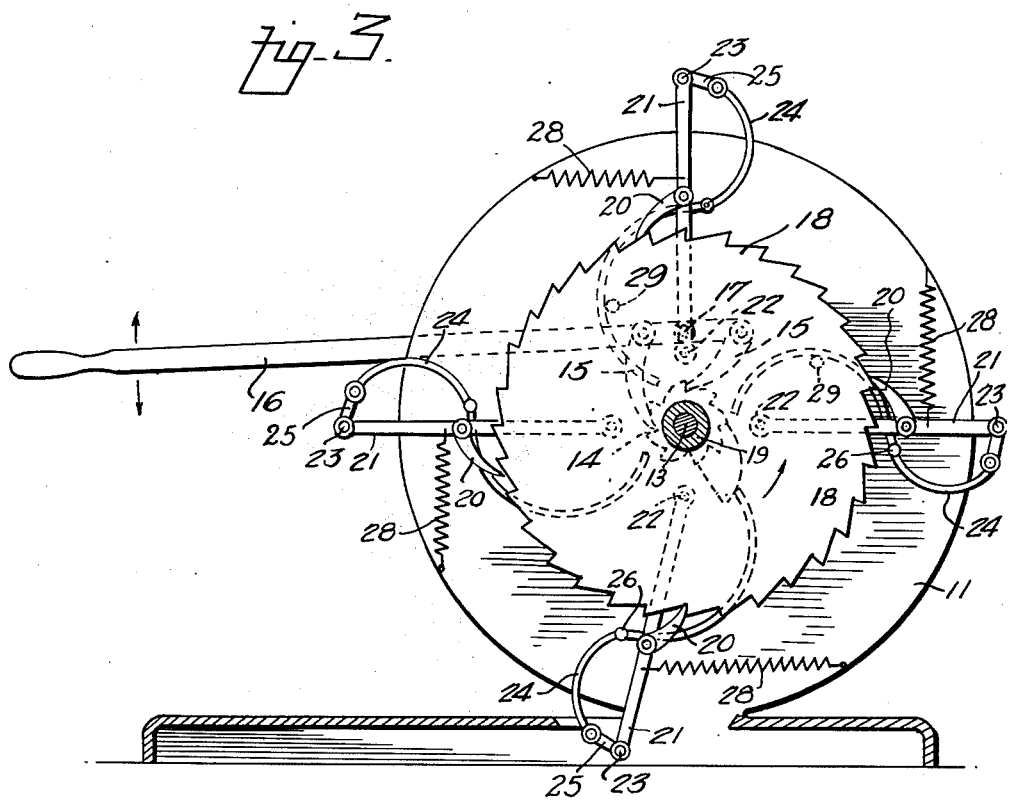
Figure 3 is a sectional view taken on line 3—3 of Figure 2, looking in the direction of the arrows.
Figure 4:
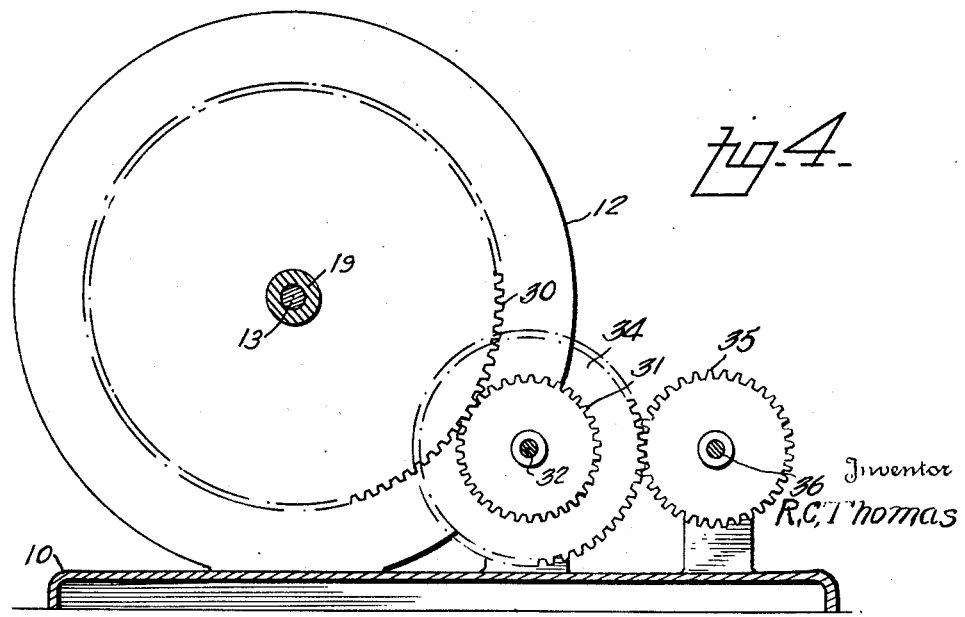
Figure 4 is a similar view taken on line 4—4 of Figure 2, looking in the direction of the arrows.

The numeral 10 indicates a base member from which rises a pair of vertical plates 11 and 12, these being spaced apart in parallel planes, and are designed to support the operating mechanisms as hereinafter disclosed. The plates carry a central shaft 13, the latter including a zone 13a of material length projecting forwardly of plate 11.

Zone 13a carries a ratcheting member 14 of relatively small dimensions which is keyed or otherwise secured to shaft zone 13a, member 14 being designed to be advanced rotatively by a pair of pawls 15, depending from a lever 16 which is pivotally carried by the front face of plate 11, the pivot point 17 of the lever being intermediate the points of connection of pawls 15 to the lever. The lever 16 is shown as a hand-operated lever oscillable about pivot 17, but it is obvious that the lever may be arranged to be operated by a treadle mechanism (not shown), or even by a power mechanism, although the invention is primarily designed for manual primary power. The depending pawls 15 are designed to engage and advance the teeth of member 14 by downward movement of the pawls, the latter ratcheting over the teeth during upward travel; since the pivot 17 is so located as to cause the pawls to travel in opposite directions, it can be understood that member 14 is positively advanced during each of the oscillating strokes of the lever 16, so that the gear advance is practically under continuous power, the momentary period of change at the end of each stroke of the lever provided by the reversal of movement, offering but small variations in the development of this regimen of continuous power application and with the interruptions intermittent. Rotation of member 14 rotates shaft 13.

Positioned on shaft 13 in rear of plate 11 and spaced therefrom, is a ratchet gear 18 of large dimensions, said gear 18 being carried by a sleeve 19 loosely mounted on the shaft 13. Gear 18 is designed to be advanced by pawls 20 which form part of the operating mechanism now to be described.

In the present disclosure four pawls 20 are being utilized to advance gear 18, these pawls being made operative in zones of approximately 90° separation, with each pawl movement provided by an individual operating unit or mechanism, the latter being rendered active in succession; since these mechanisms are substantial duplicates, but one of these will be described in detail.

Numeral 21 indicates an arm having its inner end pivotally mounted, as at 22, on the rear face of plate 11; since arm 21 swings in spaced relation to such plate space, the support for the pivot is of sufficient dimensions as to provide the desired spacing of the arm; the length of the arm is such as to project beyond the plate 11 a definite distance, the outer end of the arm carrying a pivot 23 to which the outer end of an S-shaped member or element 24 is connected by a link 25, member 24 being pivotally supported by plate 11 through a pivot 26 located at an intermediate point in the length of the member; the inner zone of member 24 crosses to the opposite side of arm 21, the inner end of such member 24 extending into the path of travel of a cam 27 carried by and movable with shaft 13. 28 designates a spring which has one end connected with arm 21 within an intermediate zone of the length of the latter, the other end of the spring being connected to plate 11—spring 28 is the power spring previously referred to.

When the inner end of member 24 is out of engagement with cam 27, arm 21 will be in a position of rest or repose with spring 28 under minimum tension status; in practice, the arm position at such time practically corresponds to a radial direction relative to shaft 13—the rest position of member 24 may be provided by a stop 29 carried by plate 11, thereby serving to limit the movement of arm 21, and thus locate arm 21 in such radially-extending position. When the working face of cam 27 begins to traverse the end zone of member 24 such end will be moved outward, thus rocking member 24 on pivot 26, and drawing the outer end of arm 21 in a direction to expand spring 28 and place the latter under tension, the latter increasing as the cam remains in contact with member 24, reaching its maximum just prior to the cam passing out of contact with member 24. When the cam leaves the end of member 24, the member is released from cam power, leaving member 24 free from restraint, thus permitting the tensioned spring 28 to become active on arm 21 to draw the latter rapidly into its position of repose, member 24 being shifted in the direction of its repose position through the travel of the outer end of arm 21 at such time, the latter rocking member 24 on its pivot 26.

This swinging of arm 21 from its position of rest carries with it the pawl 20 which is carried by arm 21, the pawl ratcheting over a tooth or teeth of gear 18 and placing the pawl working point in position to engage a tooth face. When, therefore, the spring 28 becomes active to return the arm, its pawl 20 is also advanced by such movement and serves to advance gear 18 through an arcuate distance, after which the pawl becomes inactive as a power drive, simply ratcheting over the gear teeth during advance of the gear by other pawls, resuming activity when the cam 27 again begins activity with the inner end of member 24 to repeat the cycle.

An independent operating structure of this type is used for each of the pawls 20 which may be employed—in the present disclosure four pawls 20 and their operating structures are utilized, so that during one rotation of member 14, each of the pawls 20 will have one active cycle, with the pawls becoming active successively as cam 27 advances through one revolution of shaft 13. Since gear 18 is loosely mounted on shaft 13, the length of gear advance by a pawl 20 during its cycle is more or less immaterial as long as advance of the gear is present—the relative dimensions of member 14 and gear 18 are such as to indicate that a number of revolutions of member 14 will be required to provide one revolution of gear 18, since the arcuate advance of gear 18 by the four pawls 20 shown will represent but a sector distance of gear 18. As will be understood, the pawl arrangement is such that the active pawl will be moved into position relative to a gear tooth such that during the return of arm 21 under the action of spring 28 will provide a definite advance of the gear, preferably for a distance equal to at least the distance of one tooth of the gear 18.

Since the cam is active to place the spring under tension, the power provided by the movements of lever 16 through member 14 is utilized to produce this result, the power being sufficient to provide the desired spring tension; and since the action is provided through the camming action, it will be understood that the mechanism which provides the tensioning of the spring is of a type which acts under leverage conditions such as to readily permit manual power to produce the tensioning action even though the spring 28 is of a comparatively high power type. With four of the pawl-actuating units employed, and with the rest position of member 24 controlled by stop 29, the cam can be formed to provide activity with the succeeding member 24 in immediate succession to the release of the active member, or the cam may have a form that would begin activity with the succeeding member 24 prior to release of the active member, thus reducing the time between successive impulses by beginning the tensioning of the succeeding spring as the active member is approaching its spring-release position, and at the same time increasing the length of time during which the tensioning action may be provided, and thereby increasing the power value of lever 16.

Sleeve 19 also carries a large gear wheel 30 rotatable with the sleeve, gear 30 being cooperative with a smaller gear or pinion 31 mounted on a shaft 32 carried by the plates. Shaft 32 also carries an inertia or momentum wheel 33 designed to aid in providing more uniform speed conditions to the power take-off shaft 32. Shaft 32 additionally carries a gear 34—of larger dimensions than pinion 31—which in turn meshes with a smaller gear 35 carried by shaft 36—also mounted in the plates 11 and 12—and which serves as the power take-off shaft of the disclosed mechanism. Hence, the slow speed of gear 30 is stepped up by the train of gearing 31, 34 and 35, to provide the desired take-off speed. Obviously, the train of gearing between gear 31 and the take-off shaft 36 may be varied as to ratios, or by varying the number of gears within the train, the particular train shown being designed to be illustrative only.

As will be understood, lever movements are active primarily in controlling the timing of the successive spring impulses—the more rapid the lever movements, the greater the speed of shaft 13 and the more rapid becomes the tensioning of the springs, since the cam rotation depends upon shaft 13; impulses applied to gear 18 are substantially uniform as to power, since the pawl-actuating structures are inactive the instant pawl 20 releases member 24, and since the springs are placed under similar tension values, the reaction to such release is substantially similar with each unit; the position of the pawl 20 relative to a tooth of gear 18, may vary slightly so that the total power effect of the spring power may vary slightly, but under continuous operation the slight variations tend to be neutralized through the presence of the inertia wheel 33, so that the speed of shaft 36 is determined generally by the lever movements, although the direct power for the rotation of shaft 36 is supplied by springs 28. Hence, the speed of shaft 36 is more or less responsive to the lever operations, although the latter do not provide the direct power for shaft rotation. By separating the primary power (the lever) from the direct power (the springs) in the manner indicated by the present disclosure, it is possible to set up the desirable leverage conditions which make possible the use of manual primary power and yet obtain a take-off speed provided by spring power.

As pointed out, the springs are made active intermittently, and during activity presumably provide the complete range of spring action, with successive springs providing a similar cycle. As a result the spring action is that of individual units with each unit, when active, providing its complete cycle, thus making the successive impulses similar in type.

While there is herein disclosed a preferred arrangement of spring motor mechanism, it will be readily understood that changes and/or modifications therein may be found desirable or essential in meeting the exigencies of service or the desires of an individual user, and I therefore reserve the right to make any and all such changes and modifications so seemed desirable or essential insofar as the same may fall within the spirit and scope of the invention as expressed in the accompanying claims, when broadly construed.

What is claimed as new, is:

1. In spring motor assemblies and in combination, a gear operatively connected with a power take-off shaft through a train of gearing including an inertia wheel, a ratcheting gear operative to advance said gear step-by-step, said gear and ratcheting gear each being mounted for rotation in single direction with the direction of rotation similar in both gears, a plurality of individual oscillable units mounted in circular succession for providing the step advances of the ratcheting gear, and actuating means including an oscillable lever for rendering the units active individually and successively, each unit including a spring adapted to be tensioned, by and during, means activity with the unit, the spring being inactive as a power source during such tensioning and becoming active as a power source for the unit concurrently with cessation of cooperation between the means and unit, the unit movement during means and unit cooperation being opposite in direction to that of the ratcheting gear and being similar in direction to the latter gear during the succeeding spring activity as a power source for the unit, the unit carrying a pawl adapted to advance the ratcheting gear during the spring activity as such power source.

2. An assembly as in claim 1 characterized in that the means includes a cam movable in a circular path by lever operation, the cam travel through such path rendering it active with the units individually and singly in a predetermined succession to thereby similarly develop the unit cyclar development of the several units intermittently and in predetermined order.

3. An assembly as in claim 1 characterized in that the means includes a cam movable in a constant circular path with the cam adapted to cooperatively engage with the units individually and singly in a predetermined succession while traversing such path, a shaft to which said cam is secured, said shaft additionally carrying a ratchet member, and pawl means carried by the lever co-operative with the teeth of such ratchet member to thereby rotate the shaft and advance the cam in such circular path step-by-step by the oscillations of the lever.

4. An assembly as in claim 1 characterized in that the means includes a cam movable in a constant circular path, and that each unit includes an arm having a fixed pivot in one end zone and about which the arm is oscillable, and an element having an intermediate fixed pivot, said element having its outer end zone operatively connected with the free end zone of the arm and having its inner end zone extending into the path of travel of the cam, said arm carrying one end of the unit spring, whereby said element will cause swinging movement of the arm in one direction during co-operation with the cam and place the spring under tension, the tensioned spring being rendered active to move the arm in the opposite direction by and through ending the co-operation between the cam and the element, said arm additionally carrying a pivoted pawl co-operative with the teeth of the ratcheting gear to advance the gear by spring activity.

5. An assembly as in claim 1 characterized in that the means includes a cam movable in a constant circular path, and that each unit includes an arm having a fixed pivot in one end zone and about which the arm is oscillable, and an element having an intermediate fixed pivot, said element having its outer end zone operatively connected with the free end zone of the arm and having its inner end zone extending into the path of travel of the cam, said arm carrying one end of the unit spring, whereby said element will cause swinging movement of the arm in one direction during co-operation with the cam to place the spring under tension, the tensioned spring being rendered active to move the arm in the opposite direction through ending the co-operation between the cam and the element, said arm additionally carrying a pivoted pawl co-operative with the teeth of the ratcheting gear to advance the gear by spring activity, said element having its direction of length of S-shape.

6. An assembly as in claim 1 characterized in that the means includes a cam movable in a constant circular path, and that each unit includes an arm having a fixed pivot in one end zone and about which the arm is oscillable, and an element having an intermediate fixed pivot, said element having its outer end zone operatively connected with the free end zone of the arm and having its inner end zone extending into the path of travel of the cam, said arm carrying one end of the unit spring, whereby said element will cause swinging movement of the arm in one direction during co-operation with the cam to place the spring under tension, the tensioned spring being rendered active to move the arm in the opposite direction through ending the co-operation between the cam and the element, said arm additionally carrying a pivoted pawl cooperative with the teeth of the ratcheting gear to advance the gear by spring activity, the outer end zone of the element and the free end zone of the arm being connected by a link pivotally connected to both zones.

7. An assembly as in claim 1 characterized in that the means includes a cam movable in a constant circular path, and that each unit includes an arm having a fixed pivot in one end zone and about which the arm is oscillable, and an element having an intermediate fixed pivot, said element having its outer end zone operatively connected with the free end zone of the arm and having its inner end zone extending into the path of travel of the cam, said arm carrying one end of the unit spring, whereby said element will cause swinging movement of the arm in one direction during co-operation with the cam to place the spring under tension, the tensioned spring being rendered active to move the arm in the opposite direction through ending the co-operation between the cam and the element, said arm additionally carrying a pivoted pawl co-operative with the teeth of the ratcheting gear to advance the gear by spring activity, said arm and element having possible positions of repose provided by a stationary stop co-operative with the element to thereby limit the extent of arm movement possible under spring activity.

8. An assembly as in claim 1 characterized in that the means includes a cam movable in a constant circular path, and that each unit includes an arm having a fixed pivot in one end zone and about which the arm is oscillable, and an element having an intermediate fixed pivot, said element having its outer end zone operatively connected with the free end zone of the arm and having its inner end zone extending into the path of travel of the cam, said arm carrying one end of the unit spring, whereby said element will cause swinging movement of the arm in one direction during co-operation with the cam to place the spring under tension, the tensioned spring being rendered active to move the arm in the opposite direction through ending the co-operation between the cam and the element, said arm additionally carrying a pivoted pawl co-operative with the teeth of the ratcheting gear to advance the gear by spring activity, said arm and element having possible positions of repose provided by a stationary stop co-operative with the element to thereby limit the extent of arm movement possible under spring activity, the pawl being movable with the arm and being active with a tooth of the ratcheting gear during spring power activity to advance the gear and ratcheting over gear teeth during tensioning development of the spring.

9. In spring motor assemblies and in combination, a pair of parallel plates carried by and rising from a base member with the plates in spaced-apart relation, a shaft extending therethrough and projecting forwardly of the front plate, a ratcheting member secured to such projecting end zone of the shaft, an oscillable lever pivotally supported by the front plate and carrying pawl means co-operative with the ratcheting member to advance the latter in a circular path and thereby rotate the shaft, a sleeve loosely mounted on the shaft between the plates and having a length less than the spacing distance of the plates, a ratcheting gear carried by the sleeve, a cam mounted on the shaft between the sleeve and the front plate and moved in a circular path by shaft movements, a plurality of individual gear-advancing units supported on the rear side of the front plate in substantially uniform spaced relationship with each other and adapted to co-operate individually, singly and successively with the cam during cam advance, each unit including a spring individual to the unit and adapted to be placed in tensioned condition by and during cam co-operation with the unit and to be suddenly released to provide power for advancing the ratcheting gear upon ending of such cam co-operation with the unit and with the ratcheting gear advancement step-by-step, said sleeve carrying a gear movable with the sleeve during ratcheting gear advance, and a train of gearing supported by said plates and having co-operative relationship with said gear to thereby drive a take-off power shaft, said train of gearing including an inertia wheel.

RALPH C. THOMAS.

REFERENCES CITED

The following references are of record in the file of this patent:

UNITED STATES PATENTS

| Number | Name | Date |
| --- | --- | --- |
| 229,113 | Forbes | June 22, 1880 |
| 1,249,990 | Morden | Dec. 11, 1917 |
| 1,420,120 | Maha | June 20, 1922 |
| 1,776,360 | Joyner | Sept. 23, 1930 |
| 1,890,609 | Joyner | Dec. 13, 1932 |